(12) United States Patent
Chitti et al.

(10) Patent No.: US 9,923,839 B2
(45) Date of Patent: Mar. 20, 2018

(54) CONFIGURING RESOURCES TO EXPLOIT ELASTIC NETWORK CAPABILITY

(71) Applicant: INTERNATIONAL BUSINESS MACHINES CORPORATION, Armonk, NY (US)

(72) Inventors: Mark V. Chitti, Lexington, KY (US); Douglas M. Freimuth, New York, NY (US); John F. Hollingsworth, Wynnewood, PA (US); Baiju D. Mandalia, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 14/952,466

(22) Filed: Nov. 25, 2015

(65) Prior Publication Data
US 2017/0149688 A1   May 25, 2017

(51) Int. Cl.
*H04L 12/911* (2013.01)
*H04L 12/24* (2006.01)

(52) U.S. Cl.
CPC ........ *H04L 47/781* (2013.01); *H04L 41/5003* (2013.01)

(58) Field of Classification Search
CPC .................. H04L 41/5003; H04L 47/781
See application file for complete search history.

(56) References Cited

U.S. PATENT DOCUMENTS

| | | | |
|---|---|---|---|
| 4,144,414 A | 3/1979 | Nicholas | |
| 6,205,477 B1 | 3/2001 | Johnson et al. | |
| 6,389,432 B1 | 5/2002 | Srinivas et al. | |
| 6,418,139 B1 | 7/2002 | Akhtar | |
| 6,563,829 B1 | 5/2003 | Lyles et al. | |
| 6,937,566 B1 | 8/2005 | Forslow | |

(Continued)

FOREIGN PATENT DOCUMENTS

WO   WO 2014021839 A1 *  2/2014  ............ H04L 49/00

OTHER PUBLICATIONS

Office Action in U.S. Appl. No. 14/731,834, dated Apr. 19, 2017, pp. 1-22.

(Continued)

*Primary Examiner* — Dung B Huynh
(74) *Attorney, Agent, or Firm* — William Hartwell; Matthew M. Hulihan; Heslin Rothenberg Farley & Mesiti PC (57) ABSTRACT

Resource configuration to exploit elastic network capability is provided by establishing an elastic network bandwidth allocation level to provide for an application for transfer of data between the application and an elastic network, the application hosted at a data center, then dynamically configuring, for the application, elastic network bandwidth allocation from the network service provider in accordance with the established elastic network bandwidth allocation level, and allocating storage resources of the data center for the application and processing resources of the data center for the application, the allocating being based on the established elastic network bandwidth allocation level and providing storage resources and processing resources to operate at a level commensurate with the established elastic network bandwidth allocation level.

20 Claims, 6 Drawing Sheets

(56) References Cited

U.S. PATENT DOCUMENTS

| | | |
|---|---|---|
| 7,089,294 B1 | 8/2006 | Baskey et al. |
| 7,103,906 B1 | 9/2006 | Katz |
| 7,542,420 B1 | 6/2009 | Mokhtar et al. |
| 7,590,746 B2 | 9/2009 | Slater |
| 7,685,310 B2 | 3/2010 | Ueoka et al. |
| 7,808,918 B2 | 10/2010 | Bugenhagen |
| 7,844,967 B2* | 11/2010 | Kelly .................... G06F 9/5061 718/102 |
| 8,412,824 B1 | 4/2013 | Schiff |
| 8,464,335 B1 | 6/2013 | Sinha et al. |
| 8,660,008 B2 | 2/2014 | Babiarz et al. |
| 8,762,505 B2 | 6/2014 | Kutan et al. |
| 8,788,690 B2 | 7/2014 | Short et al. |
| 8,793,343 B1 | 7/2014 | Sorenson, III et al. |
| 8,799,320 B2 | 8/2014 | Chan et al. |
| 8,873,753 B2 | 10/2014 | Parker |
| 9,026,671 B2 | 5/2015 | Gillies et al. |
| 9,172,771 B1 | 10/2015 | Gross et al. |
| 9,207,993 B2 | 12/2015 | Jain |
| 9,330,156 B2 | 5/2016 | Satapathy |
| 9,495,251 B2 | 11/2016 | Kottomtharayil |
| 9,535,776 B2 | 1/2017 | Klose |
| 9,596,144 B2 | 3/2017 | Anderson |
| 2002/0049841 A1* | 4/2002 | Johnson .................... H04L 67/10 709/225 |
| 2002/0101869 A1 | 8/2002 | Garcia-Luna-Aceves et al. |
| 2002/0112113 A1 | 8/2002 | Karpoff et al. |
| 2002/0124262 A1 | 9/2002 | Basso et al. |
| 2002/0133613 A1 | 9/2002 | Teng et al. |
| 2002/0144174 A1* | 10/2002 | Nwabueze .......... G06F 17/30867 714/1 |
| 2002/0181394 A1 | 12/2002 | Partain et al. |
| 2002/0194324 A1 | 12/2002 | Guha |
| 2003/0021338 A1* | 1/2003 | Mazzoni ............ H03M 13/2732 375/219 |
| 2003/0037061 A1 | 2/2003 | Sastri et al. |
| 2003/0069963 A1 | 4/2003 | Jayant et al. |
| 2003/0110263 A1 | 6/2003 | Shillo |
| 2003/0120666 A1 | 6/2003 | Tacaille et al. |
| 2003/0126132 A1 | 7/2003 | Kavuri et al. |
| 2003/0172130 A1 | 9/2003 | Fruchtman et al. |
| 2003/0202477 A1 | 10/2003 | Zhen et al. |
| 2004/0098671 A1 | 5/2004 | Graham et al. |
| 2004/0198360 A1 | 10/2004 | Kotzin |
| 2004/0199566 A1 | 10/2004 | Carlson et al. |
| 2004/0215644 A1 | 10/2004 | Edwards, Jr. et al. |
| 2004/0215749 A1 | 10/2004 | Tsao |
| 2004/0246972 A1 | 12/2004 | Wang et al. |
| 2005/0033935 A1 | 2/2005 | Manbert et al. |
| 2005/0125593 A1 | 6/2005 | Karpoff et al. |
| 2005/0129000 A1 | 6/2005 | Sivakumar et al. |
| 2005/0154841 A1 | 7/2005 | Sastri et al. |
| 2005/0273451 A1 | 12/2005 | Clark et al. |
| 2005/0289618 A1 | 12/2005 | Hardin |
| 2006/0129562 A1 | 6/2006 | Pulamarasetti et al. |
| 2006/0171390 A1 | 8/2006 | LaJoie |
| 2006/0206682 A1 | 9/2006 | Manbert et al. |
| 2006/0218369 A1* | 9/2006 | Fujino .................... G06F 3/0605 711/170 |
| 2006/0248231 A1 | 11/2006 | O'Rourke et al. |
| 2006/0265558 A1* | 11/2006 | Fujino .................... G06F 3/0611 711/158 |
| 2007/0022264 A1 | 1/2007 | Bromling et al. |
| 2007/0065078 A1 | 3/2007 | Jiang |
| 2007/0106798 A1* | 5/2007 | Masumitsu ............ G06F 9/5027 709/226 |
| 2007/0195765 A1 | 8/2007 | Heissenbullel et al. |
| 2007/0198627 A1 | 8/2007 | Bozionek et al. |
| 2008/0109450 A1 | 5/2008 | Clark et al. |
| 2008/0115144 A1 | 5/2008 | Tsao |
| 2008/0140850 A1 | 6/2008 | Gade et al. |
| 2008/0259798 A1* | 10/2008 | Loh ...................... H04L 45/302 370/235 |
| 2008/0320097 A1 | 12/2008 | Sawicki et al. |
| 2009/0007199 A1 | 1/2009 | JaJoie |
| 2009/0061853 A1 | 3/2009 | Anschutz |
| 2009/0100163 A1 | 4/2009 | Tsao |
| 2009/0172782 A1 | 7/2009 | Taglienti et al. |
| 2009/0187668 A1 | 7/2009 | Arendt et al. |
| 2009/0204711 A1 | 8/2009 | Binyamin |
| 2009/0217326 A1 | 8/2009 | Hasek |
| 2009/0240867 A1 | 9/2009 | Shibayama et al. |
| 2009/0271589 A1 | 10/2009 | Karpoff et al. |
| 2010/0257602 A1 | 10/2010 | Kettler et al. |
| 2010/0268632 A1 | 10/2010 | Rosenthal |
| 2010/0274656 A1* | 10/2010 | Genschel ............... G06Q 30/00 705/14.27 |
| 2010/0306382 A1* | 12/2010 | Cardosa ............... G06F 9/5044 709/226 |
| 2010/0306445 A1 | 12/2010 | Dake |
| 2010/0332401 A1 | 12/2010 | Prahlad et al. |
| 2011/0004550 A1 | 1/2011 | Giordano et al. |
| 2011/0022697 A1 | 1/2011 | Huh |
| 2011/0078227 A1 | 3/2011 | McAloon et al. |
| 2011/0083037 A1 | 4/2011 | Bocharov et al. |
| 2011/0125889 A1 | 5/2011 | Tsao |
| 2011/0158653 A1 | 6/2011 | Mazed |
| 2011/0208710 A1 | 8/2011 | Lesavich |
| 2011/0218770 A1* | 9/2011 | li .......................... G06F 11/30 702/182 |
| 2011/0282928 A1 | 11/2011 | Ball et al. |
| 2011/0293278 A1 | 12/2011 | Mazed |
| 2012/0023545 A1 | 1/2012 | Qu |
| 2012/0063353 A1* | 3/2012 | Schlenk ............... H04L 12/12 370/253 |
| 2012/0072600 A1 | 3/2012 | Richardson et al. |
| 2012/0109705 A1 | 5/2012 | Belady et al. |
| 2012/0131309 A1* | 5/2012 | Johnson ................ G06F 9/30 712/41 |
| 2012/0137173 A1 | 5/2012 | Burshan et al. |
| 2012/0180080 A1 | 7/2012 | LaJoie |
| 2012/0201130 A1 | 8/2012 | Liv et al. |
| 2012/0210381 A1* | 8/2012 | Ozawa ............ H04N 21/47202 725/114 |
| 2012/0216259 A1 | 8/2012 | Okamoto et al. |
| 2012/0331221 A1 | 12/2012 | Cho |
| 2013/0003538 A1 | 1/2013 | Greenberg et al. |
| 2013/0007254 A1 | 1/2013 | Fries |
| 2013/0031258 A1 | 1/2013 | Mukai et al. |
| 2013/0081014 A1* | 3/2013 | Kadatch ................ G06F 9/5027 718/1 |
| 2013/0185404 A1 | 7/2013 | Patel et al. |
| 2013/0204963 A1 | 8/2013 | Boss et al. |
| 2013/0205002 A1 | 8/2013 | Wang et al. |
| 2013/0212282 A1* | 8/2013 | Pulier ................... H04L 47/822 709/226 |
| 2013/0212422 A1 | 8/2013 | Bauer et al. |
| 2013/0227009 A1 | 8/2013 | Padmanaban et al. |
| 2013/0242903 A1* | 9/2013 | Narkar ............... H04W 72/087 370/329 |
| 2013/0254383 A1 | 9/2013 | Wray |
| 2013/0254407 A1* | 9/2013 | Pijewski ............... G06F 9/5083 709/226 |
| 2013/0268672 A1* | 10/2013 | Justafort ............... H04L 67/10 709/226 |
| 2013/0282795 A1 | 10/2013 | Tsao |
| 2014/0040343 A1 | 2/2014 | Nickolov et al. |
| 2014/0057592 A1* | 2/2014 | Chetlur ............... H04L 41/5064 455/405 |
| 2014/0068076 A1 | 3/2014 | Dasher et al. |
| 2014/0075029 A1* | 3/2014 | Lipchuk ................ G06F 9/505 709/226 |
| 2014/0082301 A1 | 3/2014 | Barton et al. |
| 2014/0082681 A1 | 3/2014 | Brown et al. |
| 2014/0115189 A1 | 4/2014 | Ao et al. |
| 2014/0129819 A1 | 5/2014 | Huang et al. |
| 2014/0180664 A1 | 6/2014 | Kochunni et al. |
| 2014/0188801 A1 | 7/2014 | Ramakrishnan et al. |
| 2014/0207968 A1 | 7/2014 | Kumar et al. |
| 2014/0233587 A1 | 8/2014 | Liv et al. |
| 2014/0244835 A1 | 8/2014 | Lopez Alvarez |
| 2014/0258535 A1 | 9/2014 | Zhang |

(56) References Cited

U.S. PATENT DOCUMENTS

| | | |
|---|---|---|
| 2014/0281015 A1 | 9/2014 | Orona et al. |
| 2014/0289205 A1 | 9/2014 | Soichi |
| 2014/0344879 A1 | 11/2014 | Phillips et al. |
| 2014/0365658 A1 | 12/2014 | Lang et al. |
| 2015/0006614 A1* | 1/2015 | Suryanarayanan ..... H04L 67/08 709/203 |
| 2015/0019740 A1 | 1/2015 | Zhao |
| 2015/0026793 A1 | 1/2015 | Li |
| 2015/0046960 A1 | 2/2015 | Hardin |
| 2015/0067093 A1 | 3/2015 | Sawicki et al. |
| 2015/0067744 A1 | 3/2015 | Furtwangler |
| 2015/0082362 A1 | 3/2015 | Hasek |
| 2015/0117198 A1 | 4/2015 | Menezes et al. |
| 2015/0134731 A1 | 5/2015 | Wang et al. |
| 2015/0134830 A1* | 5/2015 | Popa ..................... H04L 47/528 709/226 |
| 2015/0156204 A1* | 6/2015 | Resch .................. H04L 63/101 707/783 |
| 2015/0172070 A1 | 6/2015 | Csaszar |
| 2015/0195173 A1 | 7/2015 | Gupta et al. |
| 2015/0222445 A1 | 8/2015 | Iyer et al. |
| 2015/0234636 A1 | 8/2015 | Barnes, Jr. |
| 2015/0235308 A1 | 8/2015 | Mick et al. |
| 2015/0288919 A1 | 10/2015 | Labosco |
| 2016/0066261 A1 | 3/2016 | Nasielski et al. |
| 2016/0197835 A1 | 7/2016 | Luft |
| 2016/0197848 A1* | 7/2016 | Bhide .................. H04L 47/823 709/224 |
| 2016/0231948 A1 | 8/2016 | Gupta et al. |
| 2017/0076057 A1 | 3/2017 | Burton |
| 2017/0090773 A1 | 3/2017 | Vijayan |

OTHER PUBLICATIONS

Office Action in U.S. Appl. No. 14/952,456, dated May 17, 2017, pp. 1-25.

Office Action in U.S. Appl. No. 14/952,463, dated May 22, 2017, pp. 1-27.

Hwang et al., "Design and Implementation of an iLVM Mechanism for Remote Mirror", Kuasir College of Electrical Engineering and Computer Science, Department of Electrical Engineering, Journal of Internet Technology, 7(2), Apr. 2006, pp. 169-176.

XRoads Networks, "Dynamic Bandwidth Management", retrieved from internet Nov. 11, 2014, http://dualwanfirewalls.com/ubm/solutions/dynamic_bandwidth_control.xrn, pp. 1-4.

IBM, Internal Model for Dynamically-Virtualizing the Storage of Data Between a RAID-6 and a Mirror, IP.com, No. 000160533, Nov. 19, 2007, pp. 1-5.

Weil, Reliable, Scalable, and High-Performance Distributed Storage: Distributed Object Storage, IP.com, No. 000234957, Feb. 19, 2014, pp. 1-11.

List of IBM Patents or Patent Applications Treated as Related, Dec. 1, 2015, pp. 1-2.

Office Action in U.S. Appl. No. 14/952,449, dated Jul. 25, 2017, pp. 1-41.

Office Action in U.S. Appl. No. 14/952,437, dated Sep. 18, 2017, pp. 1-36.

Notice of Allowance in U.S. Appl. No. 14/952,456, dated Sep. 15, 2017, pp. 1-14.

Office Action in U.S. Appl. No. 14/952,469, dated Oct. 3, 2017, pp. 1-51.

Elali, H., SAN Zone Reuse in Port Allocation, https://coprhd.atlassian.net/wiki/spaces/COP/pages/8618000/SAN+Zone+Reuse+in+Port+Allocation, Oct. 15, 2015 (6 pages).

* cited by examiner

CONFIGURING RESOURCES TO EXPLOIT ELASTIC NETWORK CAPABILITY

BACKGROUND

Aspects described herein relate to configuration of data center resources of a data center utilizing an elastic network for data transfers.

Bandwidth is conventionally provisioned to meet a projected peak data demand and paid for over the course of a contract that may stretch for several years. Peak demand may occur relatively infrequently, resulting in over-provisioning for a significant amount of time. This over-provisioning of the bandwidth results in excess costs to a customer who is paying for unused bandwidth over the course of the contract.

An attempt to lower costs by provisioning less bandwidth over the course of the contract is largely ineffective because of expensive overcharges when peak demand exceeds the amount of bandwidth provisioned. Bandwidth considerations and costs are especially important in large data center applications, such as data mirroring or backup, where the amount of data being transferred, and therefore the resulting bandwidth consumption, is potentially massive.

Elastic network relationships provide benefits over conventional static network relationships by allowing bandwidth allocation to change. However, the configuration of the data center components can present a bottleneck that prevents applications of the data center from leveraging the full potential afforded by a greater level of bandwidth allocation.

SUMMARY

Shortcomings of the prior art are overcome and additional advantages are provided through the provision of a computer-implemented method that includes establishing an elastic network bandwidth allocation level to provide for an application for transfer of data between the application and an elastic network, the application hosted at a data center; dynamically configuring, for the application, elastic network bandwidth allocation from the network service provider in accordance with the established elastic network bandwidth allocation level; and allocating storage resources of the data center for the application and processing resources of the data center for the application, the allocating being based on the established elastic network bandwidth allocation level and providing storage resources and processing resources to operate at a level commensurate with the established elastic network bandwidth allocation level.

Further, a computer system is provided that includes a memory and a processor in communications with the memory, wherein the computer system is configured to perform a method including: establishing an elastic network bandwidth allocation level to provide for an application for transfer of data between the application and an elastic network, the application hosted at a data center; dynamically configuring, for the application, elastic network bandwidth allocation from the network service provider in accordance with the established elastic network bandwidth allocation level; and allocating storage resources of the data center for the application and processing resources of the data center for the application, the allocating being based on the established elastic network bandwidth allocation level and providing storage resources and processing resources to operate at a level commensurate with the established elastic network bandwidth allocation level.

Yet further, a computer program product including a computer readable storage medium readable by a processor and storing instructions for execution by the processor is provided for performing a method that includes: establishing an elastic network bandwidth allocation level to provide for an application for transfer of data between the application and an elastic network, the application hosted at a data center; dynamically configuring, for the application, elastic network bandwidth allocation from the network service provider in accordance with the established elastic network bandwidth allocation level; and allocating storage resources of the data center for the application and processing resources of the data center for the application, the allocating being based on the established elastic network bandwidth allocation level and providing storage resources and processing resources to operate at a level commensurate with the established elastic network bandwidth allocation level.

Aspects of the above have advantages in that the environment is able to be more flexible through the simultaneous manipulation of both elastic network bandwidth and the data center bandwidth (i.e. resources/capabilities of the data center) to utilize that network bandwidth. Data center resources are appropriately allocated commensurate with an elastic network bandwidth allocation level, in order to ensure that the data center is capable of exploiting the dynamically changing elastic network bandwidth levels.

Establishing the elastic network bandwidth allocation level can include establishing the elastic network bandwidth allocation level based on anticipated network demand by the application, which may be on one or more of: a usage input or historical analysis, as examples. Additionally or alternatively, the establishing may be based on one or more of: storage quality of service, network capacity efficiency, or compute demand. An advantage of elastic capacity allocation based on these parameters is that costs can be lowered or minimized because excess capacity can be shed.

The storage resources can include storage input/output ports of a storage unit of the data center, where storage input/output port capacity may be tracked. Additionally or alternatively, the storage resources can include storage input/output operations per second of a storage unit of the data center. The processing resources can include virtualized storage area network processing power of a storage area network component, processing power of a storage subsystem, and/or virtualized processor power for one or more application servers, as examples. Alternatively, any data center resources 'in the path' of network traffic and having an effect on the handling, passing, processing, etc. thereof may be allocated or controlled to an extent commensurate with the particular established and provisioned bandwidth level.

Another aspect includes establishing with the network service provider customer-specific profiles for the application to facilitate setting policy parameters at the network service provider for bandwidth allocation based on the customer-specific profiles. The dynamically configuring the elastic network bandwidth allocation can include providing, by an edge appliance of the data center, an indication to the network service provider to invoke a policy at the network service provider to configure the elastic network bandwidth allocation to be the established elastic network bandwidth allocation level. This has an advantage in that the profiles enable bandwidth and other policies to be established at the network service for easy invocation by the edge appliance when appropriate. This enables the edge appliance to dictate a change by providing an indication that invokes a policy in the dynamic network control, offloading from the edge appliance the additional responsibility that the edge appliance might otherwise have had to effect such a change.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Dynamic adjustments to elastic network bandwidth allocation enable flexibility in elastic network bandwidth provided to a data center. The configuration of data center resources, such as storage and processing resources, to fully exploit the potential of a given elastic network bandwidth allocation level may differ from the configuration needed for those resources to fully exploit the potential of a different, i.e. greater, elastic network bandwidth allocation level. Without reconfiguring data center resources despite a significant enough increase in elastic network bandwidth provided to the data center, the data center may not operate at a performance level that utilizes the additional network bandwidth. Accordingly, aspects described herein have an advantage of providing facilities for appropriately allocating data center resources commensurate with an elastic network bandwidth allocation level, in order to exploit dynamically changing elastic network bandwidth levels.

Figure 1:
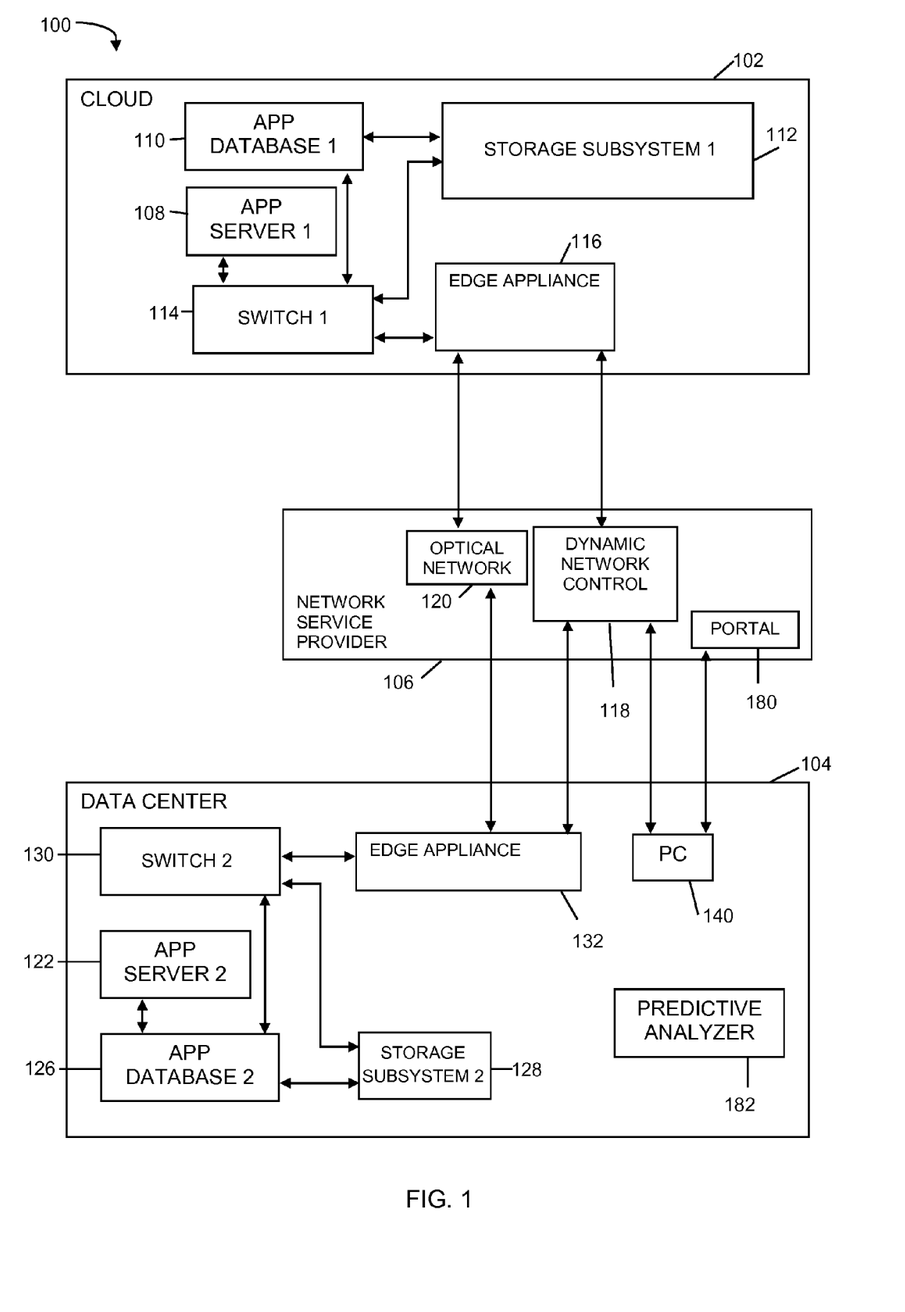
FIG. 1 depicts an example computing environment having elastic network capabilities, to incorporate and use aspects described herein.

FIG. 1 depicts an example computing environment having elastic network capabilities, to incorporate and use aspects described herein. In some examples, dedicated channel(s) across a network are utilized for data transfer from a first storage resource/location to a second storage resource/location. Environment 100 provides, as an example, data transfer between a first site 102 and a second site 104 using at least one network service provider (such as 106a) providing an elastic cloud computing network. In one embodiment, network service provider 106a provides a programmable WAN that is used for the data transfer.

First site 102 includes a first application server 108 (i.e. a computer) hosting one or more applications, a first application database 110, a first storage subsystem 112 (i.e., a first storage resource/device), for instance a storage area network (SAN) volume controller (SVC), a first switch 114 (such as a SAN switch) and a first edge appliance 116, which may be a router or other edge device, for example. In one embodiment, application server 108 or storage subsystem 112 runs a data replication application that replicates data in first application database 110 from first storage subsystem 112 via first switch 114 and first edge appliance 116.

Management of elastic network bandwidth allocation is provided in the environment. A feature of the environment 100 is that one or more processes can determine and inform a dynamic network control component (which could include an exposed application programming interface (API)) 118 of the network service provider about when and how much bandwidth of an elastic cloud computing network 120 should be allocated for transfer of data, which transfer may utilize a dedicated channel to the second site 104 via a network 120. In this example, network 120 is an optical network provided by network service provider 106a. In one embodiment, optical network 120 is used as a WAN. In another embodiment, optical network 120 is a Multiprotocol Label Switching (MPLS) network and application server 108 utilizes a Fiber Channel over Ethernet EDU01 network interface to connect first switch 114 and first edge appliance 116 to the MPLS network.

Dynamic network control 118 is executed, in one example, by a transport device (not shown), that is managed by network service provider 106a. Dynamic network control 118 allows first storage subsystem 112, second storage subsystem 128, an edge appliance (116, 132), a PC 140, or any other component at site 102, 104, or another site to dynamically change bandwidth allocation from network service provider 106a. This may be leveraged in accordance with aspects described herein to optimize bandwidth allocation and usage and therefore decrease the cost associated with transferring data using that bandwidth.

Second site 104 can include components similar to those of first site 102. Thus, in this example, second site similarly includes a second application server 122 (i.e., a computer), second application database 126, second storage subsystem 128 (i.e., a second storage resource), second switch 130, and a second edge appliance 132. In one embodiment, data is transferred from first site 102 to second site 104, i.e. from first storage subsystem 112 via first switch 114 and first edge appliance 116 over optical network 120 to second storage subsystem 128 via second edge appliance 132 and second switch 130. Data may be transferred similarly from second site 104 to first site 102. In the particular example of FIG. 1, site 104 is a data center and site 102 is a cloud facility/data center in communication with the data center via elastic network service provider 106.

As described above, elastic network 106 may be used for transferring application data between two data centers (site 102, 104) connected via a dynamically-controllable elastic wide area network. With provision of an elastic network comes the ability to dynamically allocate additional bandwidth. However, a problem exists in that a data center may not fully use the additional allocated bandwidth because of constraints imposed by the current configuration of data center resources (process resource, storage allocations, etc.). The configuration of the resources of the data center factors into the exploitation of the allocated bandwidth level. Described herein are facilities to ensure that data center resources are available to properly utilize the elasticity of the network while meeting application needs. Advantageously, this enables the environment to be more flexible through the simultaneous manipulation of both elastic network bandwidth and the data center bandwidth (i.e. resources/capabilities of the data center) to utilize that network bandwidth.

Some features described herein include:

Predicting application demand levels, which will affect network and datacenter bandwidth allocation;

Simultaneously manipulating storage, network, and compute power based on storage input/output (I/O) ports, capacity, and optimization;

Multi-tenant/customer portal parameters used in dynamic bandwidth requests;

Application-specific parameters of an edge appliance used in dynamic bandwidth requests;

Dynamic control of network service provider bandwidth based on multi-tenant/customer portal and application parameters; and Dynamic control of network service provider bandwidth based on customer priority and weighting.

Referring again to FIG. 1, data center 104 includes a predictive analyzer component 182. The predictive analyzer can combine data from a multi-tenant application hosted on application server 122, storage quality of service, network capacity efficiency, and/or compute demand to not only anticipate demand and manipulate dynamic bandwidth with the service provider, but also reconfigure storage resources (for instance resources of storage subsystem 128 or another storage device) and processing resources, such as SAN processing power of switch 130 and virtualized processing resources of application server 122. In one embodiment, the predictive analyzer is part of PC 140, though it could be part of any other data center component or part of a remote device if desired.

An application may be a multi-tenant application, and the predictive analyzer 182 can monitor and anticipate usage of that application, obtained via manual request and/or historic analysis. The predictive analyzer 182 can also keep track of port capacity for storage I/O ports of a storage device, such as storage subsystem 128, as well as bandwidth availability, for instance elastic network bandwidth availability. The predictive analyzer configures storage and processing resources based on this information.

PC 140 can perform various functions, one of which is to interact with a network service provider provisioning portal 180. The interaction may include the ability for a user to define profiles that the provisioning portal uses to set edge appliance and other device policies per the user's desired configurations. As an example, a user of PC 140 logs onto the service provider's provisioning portal 180 and provisions customer profiles. The profile provides some details about the nature and types of applications a customer is going to be using, preconfiguring the network service provider with this information. Each customer and each application then has associated characteristic(s) bound to the router/edge appliance at the site to enable control of bandwidth. The edge appliance can provide command or other indication to the network service provider to invoke some service-provider level control that is setup based on the preconfiguration provided by a profile. For each customer/application hosted at the data center, there can be one or more profiles set with the network service provider that the provider uses to set policy parameters as described herein. Features of the portal include a customer access view, customer profiles as described below, and a provisioning portlet.

Figure 2:
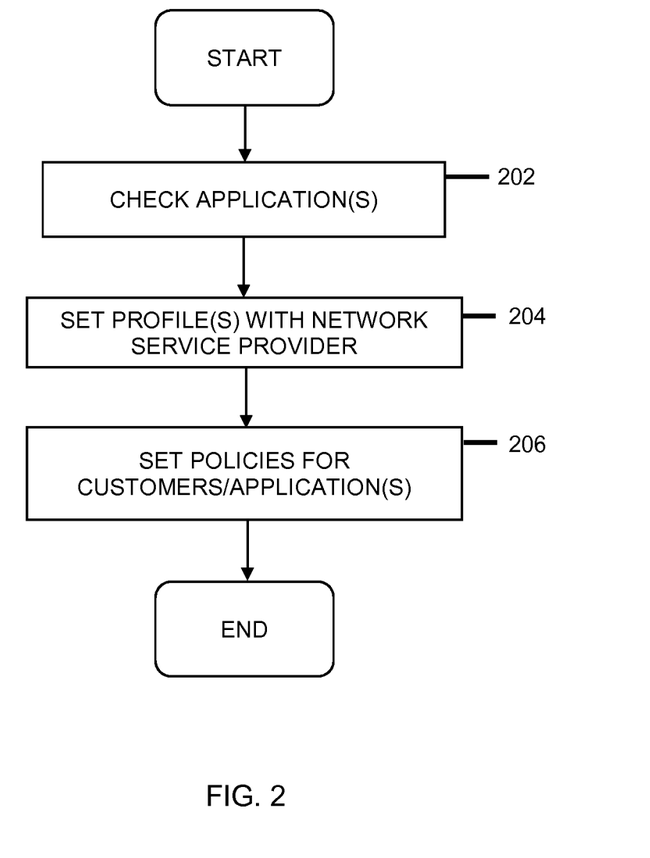
FIG. 2 depicts an example process for establishing dynamic network control policies, in accordance with aspects described herein.

FIG. 2 depicts an example process for establishing dynamic network control policies, in accordance with aspects described herein. The process begins with a component, such as the PC or predictive analyzer, checking application(s) of the application server(s) of the data center (202). The checking examines the applications for an understanding about bandwidth levels necessary or desired in order to properly manage these application(s) for transferring data. In this regard, different bandwidth levels can be associated with different applications based on the bandwidth used/requested by the applications, user-dictated appropriate levels of bandwidth, or other considerations. Checking which applications are present provides an indication of the applications involved as well as the bandwidth, storage, and processing resources the application my use.

The process continues by setting profile(s) with the network service provider (204). This is done by a data center component, such as the PC, utilizing a provisioning client and profile information to log onto the provisioning portal of the network service provider and set the profile information. The profile information can setup customer/application profiles on the provisioning portal. As an example, the profile includes an indication of parameters and the resulting network configurations (e.g. bandwidth level, quality of service, etc.) to invoke given different parameters. The profiles can be customer (i.e. tenant)-specific and/or application-specific. In one example, a profile is setup for each customer/tenant of the multi-tenant application and includes information for the particular customer's application use as it relates to the network services provided by the service provider. The profile sets up the relationship between the particular customer and the network service provider, e.g. to correlate not only the dynamic ordering of data services, but also for providing details about the nature and types of applications the customer is going to be using. The profiles provide an extra layer of policy-based automation, where each customer and each application has associated characteristic(s) bound to the router/edge appliance to enable control of bandwidth. This enables a command or other indication to be provided by the edge appliance or other device of the data center to the network service provider to invoke some service-provider level control (a policy described below).

After setting the profile(s), the process continues with the provisioning portal setting the policies for the customers/application(s) (206). The policies are built based on the profiles and implement controls suggested by the profiles in a format that the dynamic network control (118) expects. Information in a profile is used to specify or define one or more policies in a format that the network service provider's dynamic network control understands. In one example, a profile for a customer might indicate that for a given time of day, that customer's traffic for a first application is given priority over the customer's traffic for a second application.

A database of the provisioning portal can store the profiles and the portal can setup policy/policies that the network service provider uses to manage the network services in accordance with that mandate, for instance to establish a bandwidth policy for adjusting bandwidth. As noted, the policies are setup in the dynamic network control component 118 of the network service provider, which is in communication with the router or other edge appliance of the data center.

By preconfiguring the profiles that the provider uses to set policies at the service provider, it provides a simplified coordination between the data center and network service provider to adjust the network bandwidth. The edge appliance dictates a change by providing an indication that invokes a policy in the dynamic network control, offloading from the edge appliance potentially significant additional processing that might otherwise be performed by the edge appliance to effect the bandwidth change. In a specific example, the edge appliance passes a token that the dynamic network control recognizes to invoke a particular bandwidth policy for a particular customer-application pair, and the edge appliance passes the token when it recognizes certain parameters warranting a bandwidth allocation adjustment.

The policies can also dictate with how the network service provider self-manages network flow and provisioning. For example, the service provider might need some range of bandwidth ready for a spike in demand, so it can use policies to make bandwidth adjustments on its own account.

Figure 3:
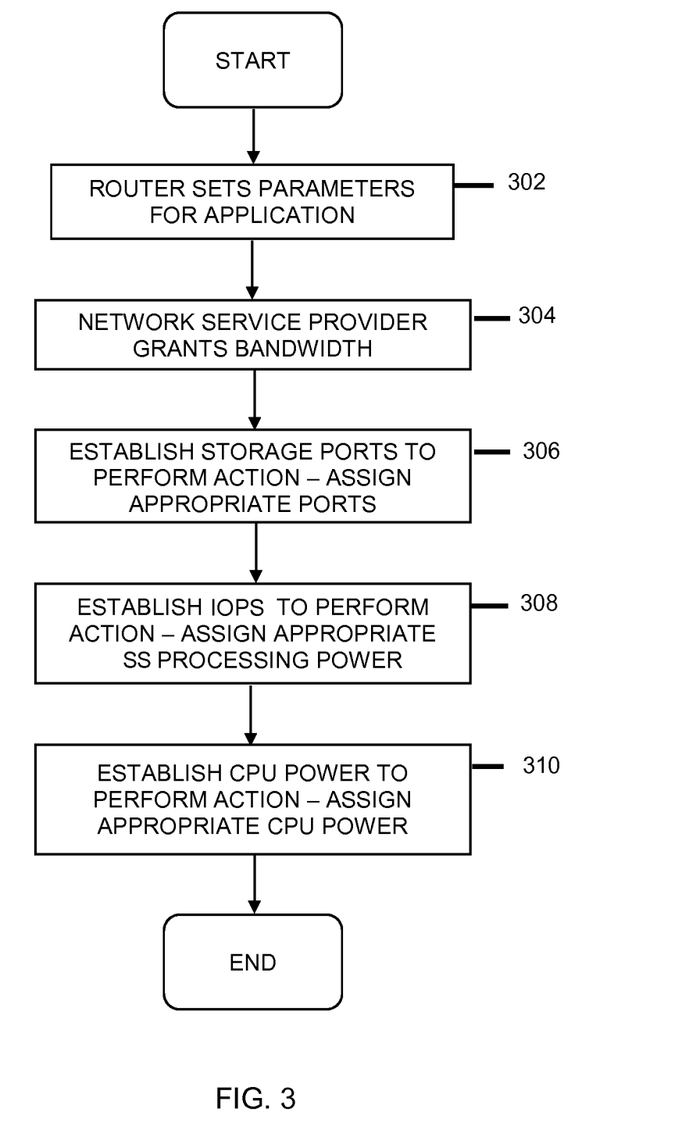
FIG. 3 depicts an example process for bandwidth control and resource assignment, in accordance with aspects described herein.

Based on multi-tenant application needs, the predictive analyzer can instruct the edge appliance to request a desired level of bandwidth via dynamic network control 118. Meanwhile, the predictive analyzer or another component can configure resources of the data center to support the desired level of bandwidth. FIG. 3 depicts an example process for bandwidth control and resource assignment, in accordance with aspects described herein. Initially, the process begins with the router (e.g. edge appliance) setting the parameter(s) for an application (302). This may be based on a predictive analyzer component 182 and/or PC 140 establishing an elastic network bandwidth allocation level to provide for the application, and optionally for a particular customer's use of the application. As an example, a router bandwidth request processor of the edge appliance provides an indication to a bandwidth control component of the dynamic network control indicating the elastic network bandwidth allocation level to configure. The indication tells the dynamic network control to invoke the policy/policies corresponding to that application for that the customer. In one example, the indication has the criteria in it—an indication of the customer and the application, for instance.

The process continues with the network service provider bandwidth control component dynamically configuring elastic network bandwidth allocation from the network service provider in accordance with the established elastic network bandwidth allocation level, for example by the network service provider bandwidth control component granting/provisioning the bandwidth (304). At the data center side, the predictive analyzer or another component allocates/assigns resources for the application to exploit to newly established level of bandwidth allocation. In a first aspect, storage ports are established/provisioned sufficient to support the application's performance and assigned appropriately (306). The storage ports may be storage I/O ports, and this provisioning may be performed by a storage device, in one example based on a request/indication of such from the predictive analyzer. An example storage device is storage subsystem 128, such as an SVC. Another example storage device is a DS8000 disk storage system offered by International Business Machines Corporation, Armonk, N.Y., U.S.A.

In another aspect, the predictive analyzer (or other component(s), such as a storage device, at the request of the predictive analyzer) establishes IOPS (I/O per second) capacity to support the application's performance, and assigns appropriate storage subsystem processing power (308). Additionally, the predictive analyzer or other component establishes CPU power to support the application's performance and assigns the appropriate CPU power of the application (310). The CPU power may be virtualized processor power, for instance in the case that the application runs in a virtual machine of the application server. In one embodiment, each of 306, 308 and 310 are performed by a PC, predictive analyzer, storage device, or any combination of the foregoing.

By the above, storage, processing, and any other type of resources that have an influence on the ability of the data center to operate are provisioned at a level commensurate with the established and provisioned bandwidth application level.

Aspects of the above may be performed as part of a dynamic control sequence that proceeds as follows: Initially, PC 140 registers a customer's use of the elastic network by providing a request to the service provider provisioning portal. Part of this registering is providing profile information to the portal as described above, and the portal can respond with a registration acknowledgement. The provisioning portal of the service provider registers policies with the dynamic network control of the network service provider for provisioning network features (e.g. bandwidth) for the customer, which is acknowledged by the dynamic network control. At some later point, a router or other edge appliance of the data center provides a bandwidth change request to the dynamic network control. The dynamic network control sets a new bandwidth allocation level with the service provider network (e.g. optical network) which confirms the setting to the dynamic network control. The dynamic network control then provides a request completion acknowledgement back to the router or edge appliance. In addition, the dynamic network control can update a bandwidth status with the provisioning portal as an informational message to inform the PC/predictive analyzer of bandwidth usage.

Figure 4:
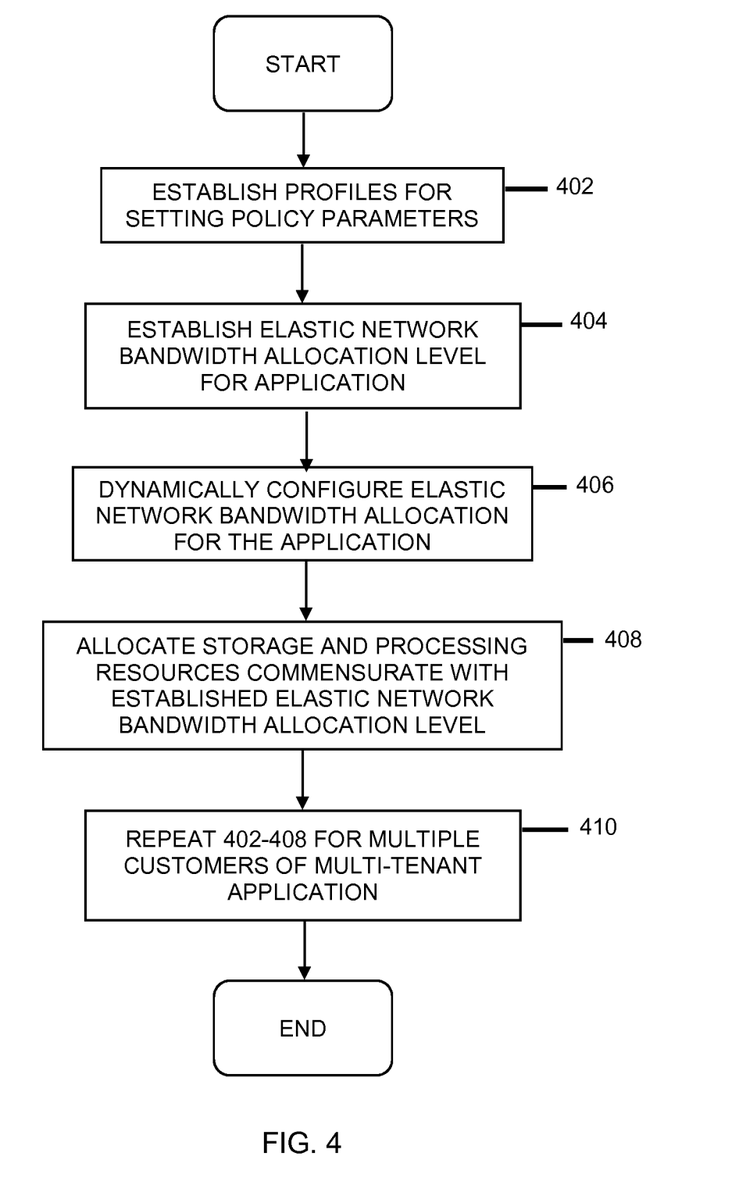
FIG. 4 depicts an example process for data center resource configuration to exploit elastic network bandwidth allocation, in accordance with aspects described herein.

FIG. 4 depicts an example process for data center resource configuration to exploit elastic network bandwidth allocation, in accordance with aspects described herein. In some embodiments, one or more aspects of the process are performed by a predictive analyzer, PC, storage device, edge appliance, or any combination of the foregoing.

The process begins by a data center component, such as a PC, establishing, with a network service provider of an elastic network customer-specific profile(s) for an application hosted at a data center, to facilitate setting policy parameters at the network service provider for bandwidth allocation based on the customer-specific profiles (402). In one example, the data center component establishes profiles on a provisioning portal of the network service provider. Advantageously, the profiles enable bandwidth and other policies to be established at the network service for easy invocation by the edge appliance when appropriate.

The process continues by the predictive analyzer or other data center component establishing an elastic network bandwidth allocation level to provide for the application for transfer of data between the application and the elastic network (404). The establishing can include establishing the elastic network bandwidth allocation level based on anticipated network demand by the application. In one particular embodiment, the anticipated network demand is based on one or more of a usage input or historical analysis by the predictive analyzer. In a further embodiment, establishing the elastic network bandwidth allocation level is based on one or more of: storage quality of service, network capacity efficiency, or compute demand. Storage quality of service might dictate that a higher bandwidth level is needed, for instance. As other examples, low network capacity efficiency might suggest that more bandwidth is needed, and higher compute demands suggests that more bandwidth is needed. Thus, as an example, the bandwidth allocation level may be established based on monitoring current demand and deciding that additional bandwidth is needed.

The process continues by dynamically configuring, for the application, elastic network bandwidth allocation from the network service provider in accordance with the established elastic network bandwidth allocation level (406). The dynamically configuring the elastic network bandwidth allocation includes, as an example, the edge appliance of the data center providing an indication to the network service provider to invoke a policy at the network service provider to configure the elastic network bandwidth allocation to be the established elastic network bandwidth allocation level. In this regard, the profile(s) setup at 402 may be used to establish policies at the network service provider and parameters of those policies to facilitate configuration of the elastic network bandwidth allocation, for example by an edge applications providing indications that such configuration is to occur. An advantage is that this enables the edge appliance to dictate a change by providing an indication that invokes a policy in the dynamic network control, offloading from the edge appliance the additional responsibility that the edge appliance might otherwise have had to effect such a change.

The predictive analyzer or component(s) acting at the predictive analyzer's request, as an example, then allocates, based on the established elastic network bandwidth allocation level, storage resources of the of the data center for the application and processing resources of the data center for the application (408). The allocating provides storage resources and processing resources to operate at a level commensurate with the established elastic network bandwidth allocation level. This has an advantage of ensuring that the data center is capable of operating at heightened performance to exploit dynamically added elastic network bandwidth.

The storage resources can include storage input/output ports of a storage unit of the data center, and a component of the data center can track storage input/output port capacity, for instance so that capacity is not overallocated. The storage resources can alternatively or additionally include storage input/output operations per second of a storage unit of the data center.

The processing resources can include any appropriate processing resources of the data center, for example virtualized storage area network processing power of a storage area network component and/or virtualized processor power for one or more application servers that host the application.

In one embodiment, the application includes a multi-tenant application servicing a plurality of different customers. In such a scenario, the establishing the profile(s) (402), the establishing the bandwidth allocation level (404), the dynamically configuring (406), and the dynamically allocating the storage resources and processing resources (408) may be tailored to a first customer of the plurality of different customers, where the method repeats (410) the establishing the profile(s), establishing the bandwidth allocation level, dynamically configuring, and allocating storage resources and processing resources, i.e. tailored for each additional customer of the plurality of different customers.

Processes described herein may be performed singly or collectively by one or more computer systems, such as computer system(s) described below with reference to FIG. 5.

Figure 5:
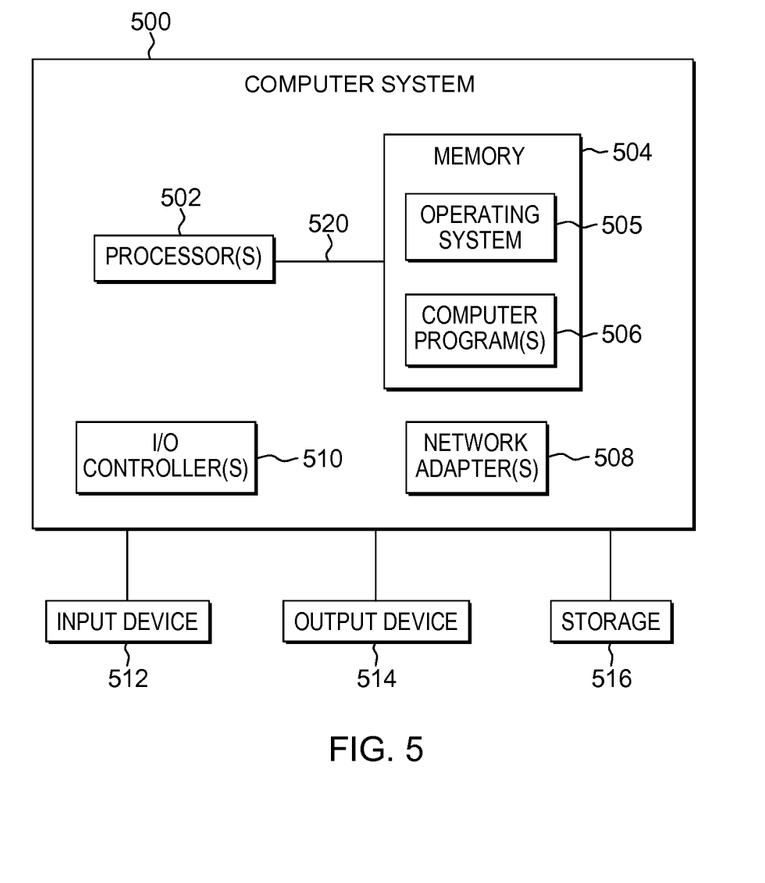
FIG. 5 depicts an example of a computer system to incorporate or use aspects described herein.

FIG. 5 depicts one example of a computer system to incorporate and use aspects described herein. A computer system may also be referred to herein as a processing device/system or computing device/system, or simply a computer. Computer system 500 may be based on one or more of various system architectures such as those offered by International Business Machines Corporation (Armonk, N.Y., USA) or Intel Corporation (Santa Clara, Calif., USA), as examples.

Computer system 500 is suitable for storing and/or executing program code and includes at least one processor 502 coupled directly or indirectly to memory 504 through, e.g., a system bus 520. In operation, processor(s) 502 obtain from memory 504 one or more instructions for execution by the processors. Memory 504 may include local memory employed during actual execution of the program code, bulk storage, and cache memories which provide temporary storage of at least some program code in order to reduce the number of times code must be retrieved from bulk storage during program code execution. A non-limiting list of examples of memory 504 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 504 includes an operating system 505 and one or more computer programs 506, for instance programs to perform aspects described herein.

Input/Output (I/O) devices 512, 514 (including but not limited to displays, microphones, speakers, accelerometers, gyroscopes, magnetometers, light sensors, proximity sensors, GPS devices, cameras, etc.) may be coupled to the system either directly or through I/O controllers 510.

Network adapters 508 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 508 used in computer system.

Computer system 500 may be coupled to storage 516 (e.g., a non-volatile storage area, such as magnetic disk drives, optical disk drives, a tape drive, etc.), having one or more databases. Storage 516 may include an internal storage device or an attached or network accessible storage. Computer programs in storage 516 may be loaded into memory 504 and executed by a processor 502 in a manner known in the art.

The computer system 500 may include fewer components than illustrated, additional components not illustrated herein, or some combination of the components illustrated and additional components. Computer system 500 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 6:
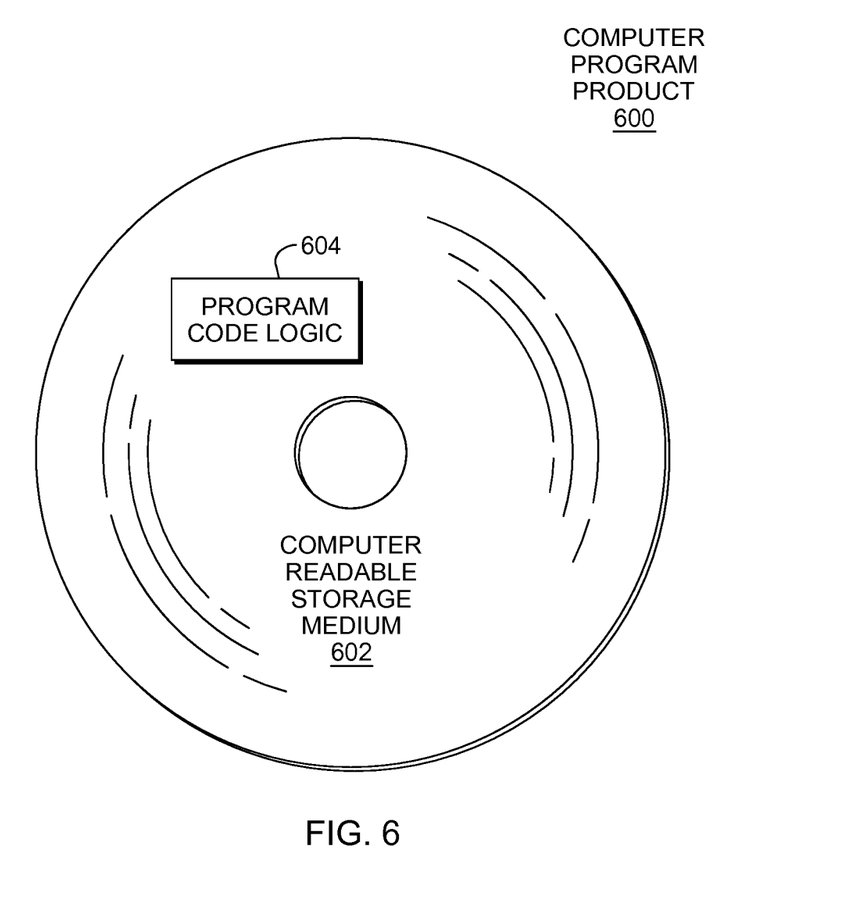
FIG. 6 depicts one embodiment of a computer program product.

Referring to FIG. 6, in one example, a computer program product 600 includes, for instance, one or more computer readable storage media 602 to store computer readable program code means, logic and/or instructions 604 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    establishing an elastic network bandwidth allocation level to provide for an application for transfer of data between the application and an elastic network, the application hosted at a data center;
    establishing with the network service provider customer-specific profiles for the application to facilitate setting policy paramaters at the network service provider for bandwidth allocation based on the customer-specific profiles;
    dynamically configuring, for the application, elastic network bandwidth allocation from the network service provider in accordance with the established elastic network bandwidth allocation level, wherein the dynamically configuring the elastic network bandwidth allocation comprises providing, by an edge appliance of the data center, an indication to the network service provider to invoke a policy at the network service provider to configure the elastic network bandwidth allocation to be the established elastic network bandwidth allocation level; and
    allocating storage resources of the data center for the application and processing resources of the data center for the application, the allocating being based on the established elastic network bandwidth allocation level and providing storage resources and processing resources to operate at a level commensurate with the established elastic network bandwidth allocation level.

2. The method of claim 1, wherein the establishing comprises establishing the elastic network bandwidth allocation level based on anticipated network demand by the application.

3. The method of claim 2, wherein the anticipated network demand is based on one or more of: a usage input or historical analysis.

4. The method of claim 1, wherein the establishing is based on one or more of: storage quality of service, network capacity efficiency, or compute demand.

5. The method of claim 1, wherein the storage resources comprise storage input/output ports of a storage unit of the data center.

6. The method of claim 5, further comprising tracking storage input/output port capacity.

7. The method of claim 1, wherein the storage resources comprise storage input/output operations per second of a storage unit of the data center.

8. The method of claim 1, wherein the processing resources comprise virtualized storage area network processing power of a storage area network component.

9. The method of claim 1, wherein the processing resources comprise virtualized processor power for one or more application servers.

10. The method of claim 1, wherein the application comprises a multi-tenant application servicing a plurality of different customers, wherein the establishing, dynamically configuring, and allocating the storage resources and processing resources are tailored to a first customer of the plurality of different customers, and wherein the method repeats the establishing, dynamically configuring, and allocating storage resources and processing resources tailored for each additional customer of the plurality of different customers.

11. A computer program product comprising:
    a computer readable storage medium readable by a processor and storing instructions for execution by the processor for performing a method comprising:
        establishing an elastic network bandwidth allocation level to provide for an application for transfer of data between the application and an elastic network, the application hosted at a data center;
        establishing with the network service provider customer-specific profiles for the application to facilitate setting policy paramaters at the network service provider for bandwidth allocation based on the customer-specific profiles;
        dynamically configuring, for the application, elastic network bandwidth allocation from the network service provider in accordance with the established elastic network bandwidth allocation level, wherein the dynamically configuring the elastic network bandwidth allocation comprises providing, by an edge appliance of the data center, an indication to the network service provider to invoke a policy at the network service provider to configure the elastic network bandwidth allocation to be the established elastic network bandwidth allocation level; and
        allocating storage resources of the data center for the application and processing resources of the data center for the application, the allocating being based on the established elastic network bandwidth allocation level and providing storage resources and processing resources to operate at a level commensurate with the established elastic network bandwidth allocation level.

12. The computer program product of claim 11, wherein the establishing comprises establishing the elastic network bandwidth allocation level based on anticipated network demand by the application.

13. The computer program product of claim 11, wherein the storage resources comprise one or more of storage input/output ports of a storage unit of the data center or storage input/output operations per second of a storage unit of the data center.

14. The computer program product of claim 11, wherein the processing resources comprise one or more of virtualized storage area network processing power of a storage area network component or virtualized processor power for one or more application servers.

15. The computer program product of claim 11, wherein the storage resources comprise at least one of the group consisting of: (i) storage input/output ports of a storage unit of the data center and (ii) storage input/output operations per second of a storage unit of the data center.

16. The computer program product of claim 11, wherein the processing resources comprise at least one of the group consisting of: (i) virtualized storage area network processing power of a storage area network component, and (ii) virtualized processor power for one or more application servers.

17. A computer system comprising:
    a memory; and
    a processor in communication with the memory, wherein the computer system is configured to perform a method, the method comprising:

establishing an elastic network bandwidth allocation level to provide for an application for transfer of data between the application and an elastic network, the application hosted at a data center;

establishing with the network service provider customer-specific profiles for the application to facilitate setting policy paramaters at the network service provider for bandwidth allocation based on the customer-specific profiles;

dynamically configuring, for the application, elastic network bandwidth allocation from the network service provider in accordance with the established elastic network bandwidth allocation level, wherein the dynamically configuring the elastic network bandwidth allocation comprises providing, by an edge appliance of the data center, an indication to the network service provider to invoke a policy at the network service provider to configure the elastic network bandwidth allocation to be the established elastic network bandwidth allocation level; and allocating storage resources of the data center for the application and processing resources of the data center for the application, the allocating being based on the established elastic network bandwidth allocation level and providing storage resources and processing resources to operate at a level commensurate with the established elastic network bandwidth allocation level.

18. The computer system of claim 17, wherein the storage resources comprise one or more of storage input/output ports of a storage unit of the data center or storage input/output operations per second of a storage unit of the data center, and wherein the processing resources comprise one or more of virtualized storage area network processing power of a storage area network component or virtualized processor power for one or more application servers.

19. The computer system of claim 17, wherein the storage resources comprise at least one of the group consisting of: (i) storage input/output ports of a storage unit of the data center and (ii) storage input/output operations per second of a storage unit of the data center.

20. The computer system of claim 17, wherein the processing resources comprise at least one of the group consisting of: (i) virtualized storage area network processing power of a storage area network component, and (ii) virtualized processor power for one or more application servers.

\* \* \* \* \*